March 10, 1964     C. KOSTA     3,124,106
RETRACTABLE HOLDER FOR CHALK, CRAYON, ERASERS, AND SMALL
WRITING AND CUTTING INSTRUMENTS
Filed July 13, 1961     4 Sheets-Sheet 1
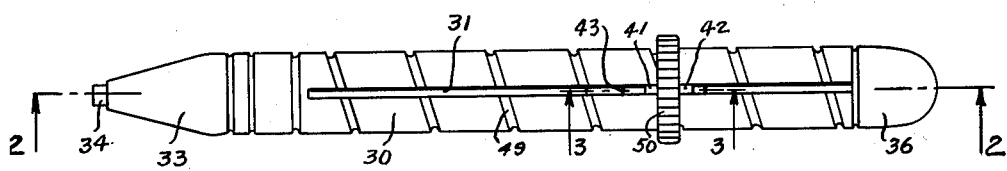
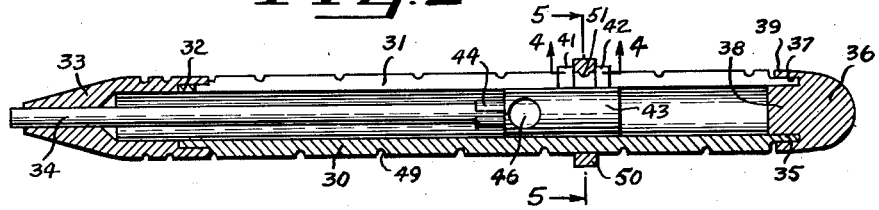
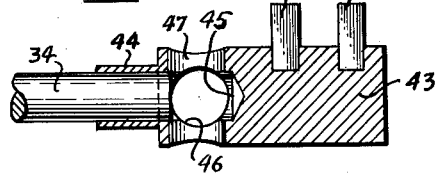
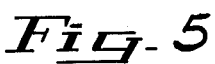
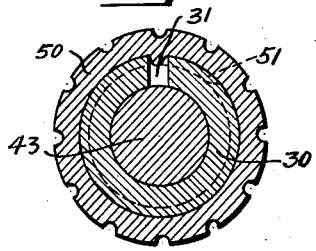
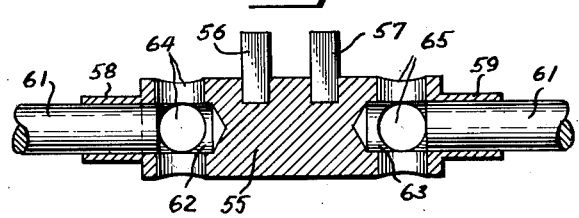
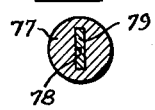
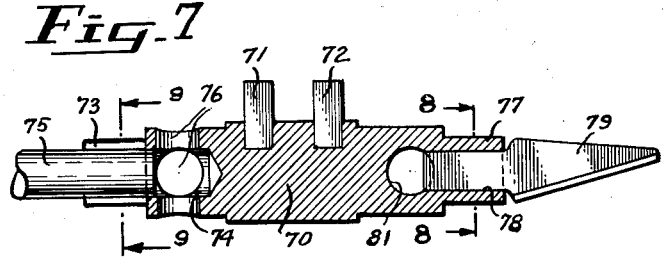
INVENTOR
CHARLES KOSTKA
BY L. S. Saulsbury
ATTORNEY

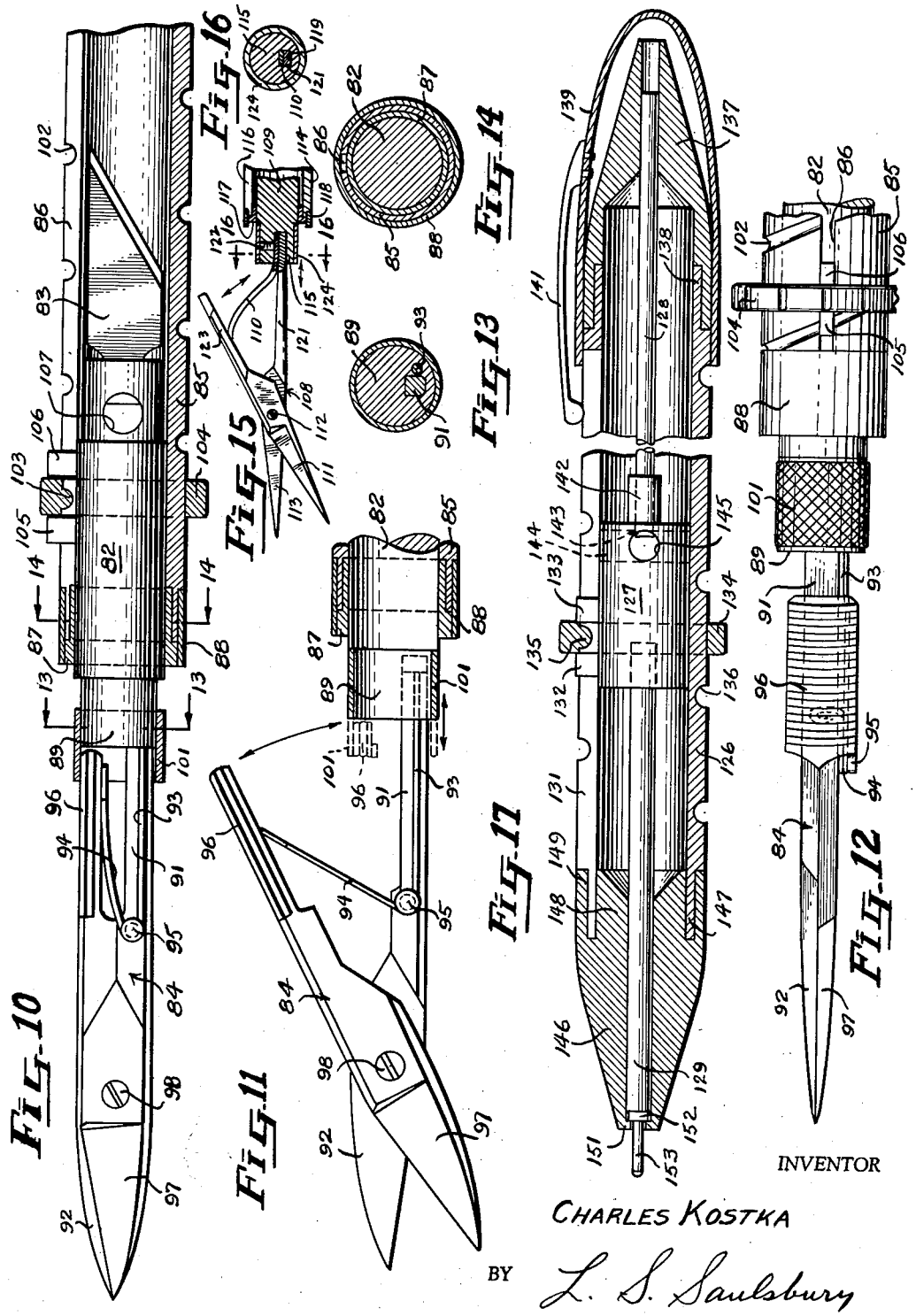

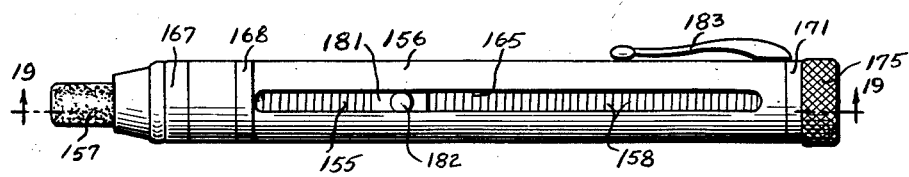
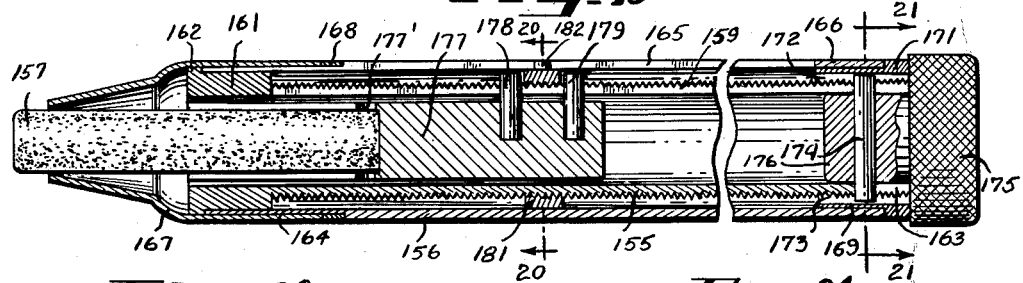
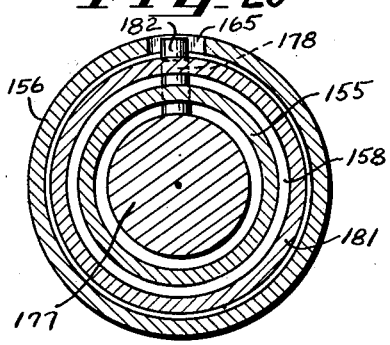
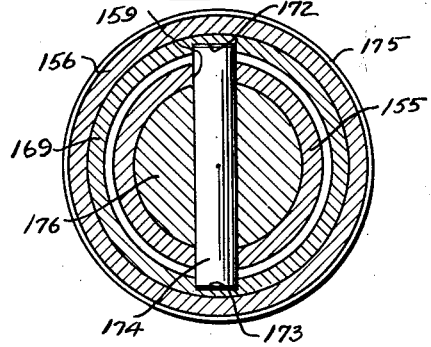
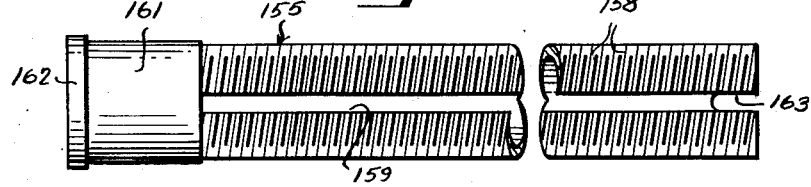
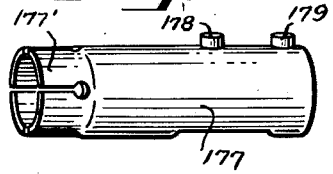
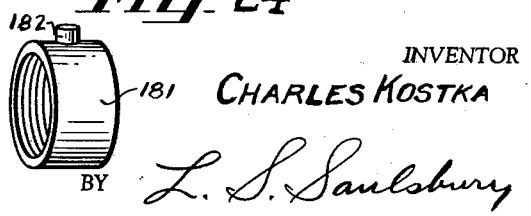
INVENTOR
CHARLES KOSTKA

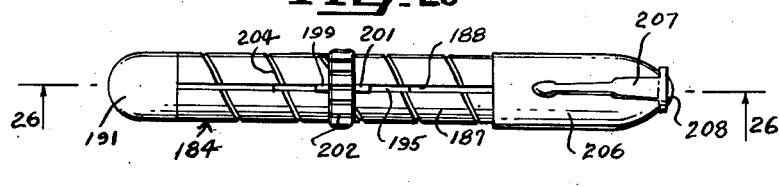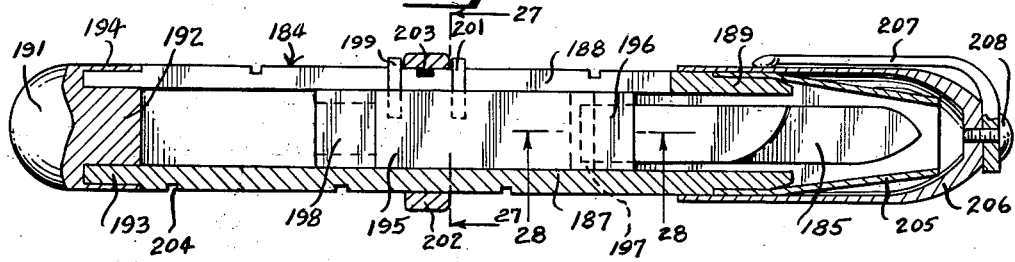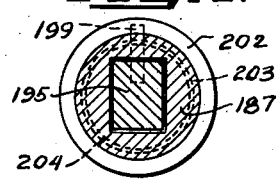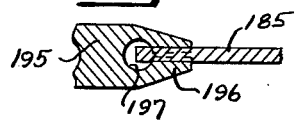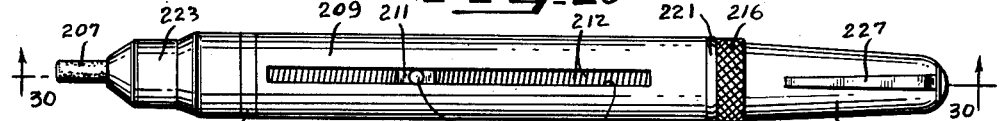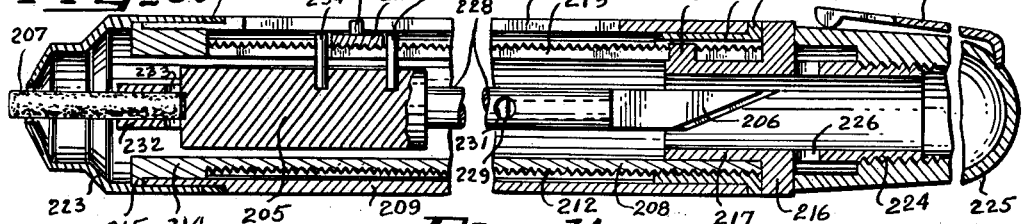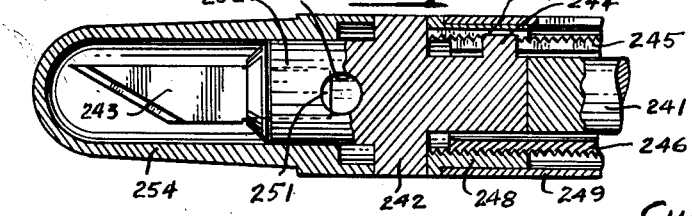

# United States Patent Office 3,124,106
Patented Mar. 10, 1964

3,124,106
RETRACTABLE HOLDER FOR CHALK, CRAYON, ERASERS, AND SMALL WRITING AND CUTTING INSTRUMENTS
Charles Kosta, Bronx, N.Y.
(4 Dock St., Mount Vernon, N.Y.)
Filed July 13, 1961, Ser. No. 123,902
6 Claims. (Cl. 120—1)

This invention relates to retractable holders for chalk and crayon pieces, rubber erasers, small cutting blades, small scissors, and ball point pens and similar small instruments.

It is the principal object of the present invention to provide a retractable holder for chalk, crayons, erasers and small writing and cutting instruments which will have a simple, positive, fast and effective propelling and retracting mechanism upon the tube holder for extending and retracting the chalk, eraser, crayon and the small writing and cutting instruments.

It is another object of the invention to provide a retractable holder for chalk, crayon, erasers and writing and cutting instruments which has a double carriage that will carry two pieces or instruments or a combination thereof, one being extended from one end and the other being extended from the other end.

It is still another object of the invention to provide a retractable holder with a simple internal ring means at the open end of a longitudinally slotted holder tube for maintaining the shape of a holder tube or barrel to prevent the contraction and binding of the longitudinal slot serving as the guideway for the fast propelling and retracting mechanism.

It is still another object of the invention to provide a retractable holder for chalk, crayon and eraser pieces in which the same is so retained and extended from the holder tube that the material piece can be used up to a quarter of an inch in length and still be easily removed from the holder and keep to a minimum the amount of material that would be wasted.

It is still another object of the invention to provide a retractable holder for chalk, crayon, and eraser pieces that has a split-sleeve projection on the end of the carriage or plunger provided for receiving the piece of chalk, crayon or eraser to frictionally retain it and that has cross holes at the root of the carriage sleeve projection to permit if necessary the insertion of a small instrument to eject the remaining material in the propelling carriage whereby the refilling of the pieces is facilitated.

It is a further object of the invention to provide a retractable holder for chalk, eraser and crayon pieces, and writing and cutting instruments in which a combination of these pieces and instruments can be respectively retained in the opposite ends of the carriage in the holder tube and propelled and retracted from the opposite end of the holder tube as desired, and to present for example a crayon from one end and an eraser from the opposite end or in like manner other combinations.

It is a still further object of the invention to provide a combination knife and scissors in one holder that can be selectively and quickly propelled into position for use.

It is a still further object of the invention to provide one propelling writing instrument holder that has a crayon or pencil extendable from one end and a ball point pen extendable from the other end.

It is a still further object of the invention to provide a retractable holder that has an eraser extendable from one end and a scraper blade extendable from the other end.

Still further objects of the invention are to provide a retractable holder for chalk, erasers, crayon and small instruments, having the above objects in mind, which is of simple construction, has a minimum number of parts, easy to assemble, inexpensive to manufacture, easy to refill, of pleasing appearance, compact, efficient and effective in use.

For other objects and for a better understanding of the invention, reference may be had to the following detailed description taken in connection with the accompanying drawing, in which FIGURE 1 is a longitudinal view of a retractable holder for a chalk, eraser, or crayon constructed according to one form of the invention, FIG. 2 is a longitudinal sectional view of the holder shown in FIG. 1 as viewed on line 2—2 thereof, FIG. 3 is an enlarged longitudinal sectional view of the propelling carriage that retains the chalk, eraser or crayon removed from the holder sleeve and as viewed on line 3—3 of FIG. 1, FIG. 4 is an enlarged longitudinal sectional view of the operating ring and carriage projections looking upon the inner face thereof and propelling projection as viewed generally on line 4—4 of FIG. 2, FIG. 5 is an enlarged cross-sectional view of the holder and its operating ring as viewed upon line 5—5 of FIG. 2, FIG. 6 is an enlarged longitudinal sectional view of a double holder carriage constructed according to another form of the invention in which the chalk, eraser or crayon pieces will extend from two ends of the carriage and respectively through either of the opposite ends of the holder tube or barrel, FIG. 7 is a longitudinal sectional view of a double holder carriage adapted to hold either chalk, eraser or crayon piece at one end of the carriage and to hold a cutting blade at the opposite end thereof, FIG. 8 is a cross-sectional view of the carriage taken across the cutting blade end thereof and on line 8—8 of FIG. 7, FIG. 9 is a cross-sectional view of the carriage taken across the split chalk holding end of the carriage and on line 9—9 of FIG. 7, FIG. 10 is an enlarged fragmentary longitudinal sectional view of a holder constructed according to a modified form of the invention and bearing a carriage with a pair of small scissors at one end and a cutting or scraper blade at the other end, FIG. 11 is a similar sectional view of the holder shown in FIG. 10 with the scissors opened, FIG. 12 is a fragmentary top plan view of the holder shown in FIGS. 10 and 11, FIG. 13 is a transverse sectional view of the holder as viewed on line 13—13 of FIG. 10, FIG. 14 is a transverse sectional view of the holder as viewed on line 14—14 of FIG. 10, FIG. 15 is a fragmentary longitudinal sectional view"

of a holder in which the scissors are biased to their open position by a different type of spring than the spring shown in FIGS. 10 and 11, FIG. 16 is a fragmentary transverse sectional view of the holder of FIG. 15 as viewed on line 16—16 thereof, FIG. 17 is a longitudinal sectional view of a retractable holder having a double carriage that may extend either a crayon or a ball point pen and with a pocket clip closure cap adapted to fit either end of the holder, FIG. 18 is a side view of a chalk holder constructed according to still another form of the invention in which the operating threads of the holder are provided on an inner tube enclosed by an outer tube, the propelling of the chalk carriage being effected by a turn knob on one end of the holder, FIG. 19 is an enlarged fragmentary longitudinal sectional view of the chalk holder shown in FIG. 1 as viewed generally on line 19—19 of FIG. 18, FIG. 20 is an enlarged cross-sectional view of the chalk holder shown in FIG. 19 taken through the carriage and propelling ring thereof and as viewed generally on line 20—20 of FIG. 19, FIG. 21 is an enlarged cross-sectional view of the chalk holder shown in FIG. 19 and taken through the pin connection of the turn knob with the inner tube as viewed generally on line 21—21 thereof, FIG. 22 is a top view of the inner tube removed from the holder of FIG. 18 showing the longitudinally-extending operating slot thereof and the threads thereon, FIG. 23 is a perspective view of the chalk holder carriage taken from the holder of FIGS. 18 and 19, FIG. 24 is a perspective view of the internally threaded propelling ring taken from the holder of FIGS. 18 and 19 and that is operable over the threads of the inner tube, FIG. 25 is an elevational view of a retractable holder in which a knife blade is contained, FIG. 26 is an enlarged longitudinal sectional view of the holder shown in FIG. 25 and as viewed on line 26—26 thereof, FIG. 27 is a cross-sectional view of the holder of FIG. 25 as viewed on line 27—27 of FIG. 26 and looking in elevation upon the propelling ring, FIG. 28 is a fragmentary longitudinal sectional view of the carriage and knife blade used in the form of the invention shown in FIG. 25 and as viewed on line 28—28 of FIG. 26, FIG. 29 is an elevational view of a holder having a double carriage for a knife blade and crayon constructed according to a still further form of the invention and in which the carriage is operated by a turn knob disposed in the ends of inner and outer tubes and through which the knife blade may be extended and in which a pocket clip closure cap is threaded to an extension of the turn knob, FIG. 30 is an enlarged longitudinal sectional view of the holder shown in FIG. 29 and as viewed generally on line 30—30 thereof, FIG. 31 is a fragmentary longitudinal sectional view of a holder constructed according to a still further form of the invention in which the knife blade is mounted on the turn knob instead of being extendable through the turn knob as with the form of the invention shown in FIG. 30.

Referring now particularly to FIGS. 1 to 5, 30 represents a holder tube for containing the various parts of the holder. This tube has a longitudinally-extending slot 31 that runs substantially the full length of the holder tube 30 from a forward closed end portion 32 through the upper end of the holder tube. The closed end portion 32 is reduced in diameter and receives a pointed tip 33 through which a piece of chalk, eraser or crayon as indicated at 34 may be extended. The pointed tip 33 is tight fitted over the tube end portion 32. The opposite end of the holder tube 30 has a reduced diameter 35 through which the slot 31 extends and over which a solid cap 36 is tight fitted. This cap 36 has a circular groove 37 therein for receiving the reduced end portion 35 of the tube 30. The cap 36 has a central portion 38 that fits the interior of the holder tube 30 and a concentric outer portion 39 provided by the recess 37 so that the reduced diameter end portion 35 of the holder tube 30 upon being forced thereinto is prevented from contraction and expansion to maintain thereby the width of the longitudinally-extending slot 31.

This longitudinally-extending slot 31 serves as a guideway for longitudinally-spaced upwardly-extending projections 41 and 42 of an internal cylindrical carriage 43 that is adjustable through the holder tube 30. This carriage 43 has a reduced diameter split sleeve forwardly-extending projection 44 for receiving the end of the crayon or eraser 34 and aligned with a central forward opening 45 from which extend transverse crossed holes 46 and 47 through which access can be had with an instrument to the inner end of the chalk, eraser, crayon to eject the same when the piece has become worn and is to be replaced.

On the exterior of the holder tube 30, is a continuous spiral groove 49 running from one end of the tube to the other. An operating ring 50 surrounds the exterior of the tube between the carriage projections 41 and 42 that extend radially-upwardly through the longitudinally-extending slot 31. This operating ring 50 has an internal thread 51 that cooperates with the groove 49 so that as the ring is turned on the tube holder 30 the thread moves in the groove 49 to cause the carriage 43 with the chalk, eraser or crayon piece 34 to be adjusted through the pointed end tip 33. The external surface of the operating ring is serrated to provide a better grip by which to turn the ring.

IN FIG. 6, is a double carriage 55 that can be operable in the same slotted tube 30 but wherein both ends of the slot 31 are closed to prevent the contraction thereof and the binding of longitudinally-spaced projections 56 and 57 on the carriage 55 that traverse this slot. The carriage 55 has split sleeve projections 58 and 59 extending from its opposite ends thereof for accommodating a piece of chalk, eraser or crayon, as indicated respectively at 61 one in one projection, and one in the other projection as may be desired. The sleeve projections are aligned with respective openings 62 and 63 respectively that are respectively provided with cross holes 64 and 65 so that access may be had with an instrument to the inner end of the chalk, eraser or crayon piece 61 to eject or unseat it from the carriage 55. This carriage 55 can be moved in either direction by the ring 50 so that either one or other of the chalk, eraser or crayon pieces can be extended through one of the pointed tip ends 33 of the modified tube 30 at a time.

Referring now to FIGS. 7, 8 and 9, there is shown a carriage 70 having upwardly-extending projections 71 and 72 that are moved by the ring 51. This carriage 70 has a split sleeve projection 73 in line with a hole 74 at one end thereof to receive a piece of chalk, eraser or crayon 75 and cross openings 76 for access with an instrument to dislodge from the hole 74 the worn piece of chalk, eraser or crayon 75. The opposite end of this carriage 70 has a reduced diameter projection 77 with a small hole 78 of rectangular section for receiving a shank portion of a sharp cutting or scraping blade 79. The reduced diameter projection has a transverse hole 81 in the carriage for receiving a tool to dislodge the cutting blade 79.

Referring now particularly to FIGS. 10, 11, 12, 13 and 14, there is shown a construction employing a carriage 82 for retaining a cutting instrument 83 and scissors 84 at opposite ends thereof. A tube 85 having a longitudinal slot 86 that extends through the ends thereof and is internally reinforced thereat by internal reinforcing sleeve 87 and an external sleeve 88 concentrically arranged thereover, this ring assembly for only one end being shown. The carriage 82 can move through the internal reinforcing sleeve 87 and has a solid extension 89 in which is embedded an extension 91 of a fixed scissor 92 and an extension 93 of a hairpin-like operating spring 94 carried on a pin 95. This hairpin spring 94 being anchored by its extension 93 in the solid end 89 of the carriage 82 reacts against the underside of a thumb-worked extension 96 of a movable blade 97 on pin 95 to open the scissors 84. A rough ring sleeve 101 is slidable upon the solid extension 89 and upon the scissors being closed to fit over the movable blade thumb extension 96 in the manner shown in FIG. 10 to hold the scissors closed so that they may be retracted. To release the scissors the sleeve ring 101, after they have been extended, is withdrawn as shown in FIG. 11 and then by grasping the holder tube 85 with one hand and placing the thumb upon the blade extension 96 and depressing the same against the action of the hairpin spring 94 the scissors 84 may be easily worked. With the scissors retained closed by the sleeve ring 101 the carriage 82 can be easily retracted with the scissors into the holder tube 85. The holder tube 85 has an external spiral groove 102 for receiving an internal thread 103 of an external operating ring 104, that lies between two spaced projections 105 and 106 extending radially outward through and confined within the slot 86 to move the carriage through the holder tube 85 with the cutting blade 83 and scissors 84. The cutting or scraping blade 83 can be similarly extended through the opposite end of the tube 85 and can be dislodged from the carriage by extending a pry into a hole 107 and working it against the shank of the blade.

In FIGS. 15 and 16, there is shown scissors 108 fixed to a carriage 109 with a movable blade 111 being pivoted upon a pivot screw pin 112 on fixed blade 113. The carriage 109 is adjustable through a holder tube 114 in the same manner as above described with reference to the FIGS. 10 to 14 and has a reduced diameter end portion 115 on which the scissors 108 are mounted. The holder tube 114 has a slot 116 that is held against collapse by internal and external rings 117 and 118 fixed to the end of the holder tube 114 and through which the carriage and the scissors slide. In the end of the projection 115 is a hole 119 in which an extension 121 of the fixed blade 113 and the leaf spring 110 are tightly fitted and held fixed therein by a set screw 122.

The movable scissor blade 111 has a shorter extension 123 which the user of the holder can depress with his thumb while holding the tube 85 in his hand and with the movable blade 111 being freed as shown in FIG. 15 and against the action of the leaf spring 110. When it is desired to retract the scissors into the tube 114, the thumb extension 123 of the movable blade 111 is depressed against the action of the spring 110 and a retaining ring 124 is slid from the carrier projection 115 over the thumb extension 123 whereby the scissors will be held in a closed position. Thereafter, the carriage and the scissors can be retracted into the tube 114 in the manner above described in connection with the form of the invention shown in FIGS. 10 to 14.

To release the scissors again and make them available, the scissors and the carriage are extended out of the end of the tube 114 and the retaining ring 124 is forced rearwardly from the extension 123 of the movable blade 111 to the position shown in FIG. 15 so that the movable blade 111 is released to be opened by the spring 110. The scissors then can be used in the usual manner to effect the cutting operation upon sheet material.

In FIG. 17, there is shown a holder 126 with a double carriage 127 from which there extends a crayon piece 128 in one direction and a ball point pen element 129 in the opposite direction. The holder tube 126 has a top longitudinally-extending slot 131 into which projections 132 and 133 from the carriage 127 extend. Between these projections 132 and 133, is a propelling ring 134 having a thread 135 that travels in a fast groove 136 in the outer surface of the holder tube 126. As the propelling ring 134 is turned on the tube 126, the carriage 127 with the crayon and ball point pen 129 is propelled through the holder tube 126 so that one or the other is extended or retracted.

The crayon piece 128 will be extended through a pointed end member 137 that is fitted upon a reduced end 138 of the holder tube 126 and through which the slot 131 of the tube does not extend. When the crayon 128 is retracted a closure cap 139 with a clip 141 may be fitted over the pointed end member 137 and the tube 126 to close one end of the holder and render the holder adaptable to be retained in one's pocket by the clip 141. The crayon piece 128 is held on the carriage 127 by a reduced diameter split sleeve portion 142 and opening 143 of the carriage and can be dislodged by extending an instrument into transverse hole 144 or 145 and pry the crayon piece.

The ball point element 129 is tightly fitted on the opposite end of the carriage 127 so that it can be pushed and pulled through a pointed end member 146 tightly fitted over a reduced end portion 147 on the end of the holder tube with its central portion 148 holding the tube against contraction of the slot 131 and by a concentric external sleeve portion 149 against outward expansion.

The pointed end member 146 has a small end shoulder 151 for restricting the outward movement of the ball point pen by engagement of its shouldered end portion 152 thereagainst while a ball containing portion 153 will be extended forwardly of the pointed end member 146. It will be seen by this form of the invention shown in FIG. 17 that the holder is readily adapted for the double use of a crayon and a ball point pen, both being made readily accessible from the respective opposite ends of the holder tube. The holder tube 126 is sufficiently long so that upon centering the carriage within the holder tube, both the crayon and the ball point pen may lie fully protected therewithin. By use of the cap 139 the holder can be easily carried in the pocket and made secure thereto by the clip 141.

Referring now particularly to FIGS. 18 to 24, there is shown a chalk holder having fast propelling action wherein the threads for causing the action are provided upon an unexposed inner sleeve 155 and are enclosed by an outer tube 156 to provide a smooth exterior surface which can be gripped while using a chalk piece 157. The inner sleeve 155 as best shown in FIG. 22 is provided with external threads 158 extending from one end and throughout the extent of which there is a longitudinal slot 159 which is closed at the forward end by an integral sleeve portion 161 having an external stop shoulder 162. Upon the open slot end of the inner sleeve 155 and diametrically opposite from the slot 159, there is provided a short slot 163, FIGS. 19 and 22, the purpose of which will be soon explained.

The smooth outer sleeve 156 is assembled at one end by its reduced end portion 164 upon the closed sleeve portion 161 of the inner sleeve and against the stop shoulder 162 as best seen in FIG. 19. The outer sleeve has a longitudinal slot 165 that extends from a closed end portion 166 through the forward end of the outer sleeve 156 and is held against being spread at its forward end by a ring 168 fixed over the reduced end portion 164 and is abutted by a chalk cap 167 that surrounds the chalk piece 157 and closes off the closed end of the threaded inner sleeve 155.

The threads 158 on the inner sleeve 155 are left hand and threaded onto them is a retaining sleeve ring 169 that is shouldered at 171 to bear against the closed end 166 of the outer sleeve 156. This ring 169 holds the inner sleeve 155 in the outer sleeve 156 against forward displacement while the shoulder 162 on the inner sleeve 155 holds the outer sleeve thereon against rearward displacement, yet permitting the inner sleeve to be turned in the outer sleeve. This retaining ring 169 has opposing grooves 172 and 173 in its threaded internal face to accommodate when aligned respectively with the slot 159 and short slot 163 of the inner sleeve 155 a transverse pin 174 carried by a turn knob 175 in a reduced diameter portion 176 that fits into the open slot end of the inner sleeve 155 to hold it against contraction across its slot 159 and with the pin ends extending respectively through the slots 159 and 163 of the inner sleeve and into the grooves 172 and 173 of the ring 169. The inner sleeve 155 and the retaining ring 169 are thus turned within the outer sleeve 156 by the turn knob 175.

The chalk piece 157 is tightly fitted by its inner end in a split sleeve portion 177′ of the carriage 177. The carriage has two spaced pins 178 and 179 projecting from the same into the slot 159 of the inner sleeve 155 and arranged to accommodate a threaded propelling ring 181 that is operable over the threads 158 of the inner sleeve 155 but held against rotation by a pin projection 182 that extends into the longitudinal slot 165 of the outer sleeve 156. Accordingly, as the turn knob 175 is operated, the inner sleeve 155 is turned and the propelling ring 181 is worked longitudinally along with threads 158 of the inner sleeve 155 and through the slot 165 of the outer sleeve 156 of the holder to propel the carriage 177 and the chalk piece 157 tightly fitted in the split end portion 176 of the carriage 177. In this maner, the chalk piece 157, by turning the knob to the right, is extended through the cap 167 or by reverse turning of the hand knob 175 the chalk piece will be retracted and protected against breakage. The chalk piece 157 need not be extended to any great extent so that it will be held rigidly within the holder and against easy accidental breakage resulting from excess application of pressure as happens when chalk pieces are held raw in the hand. A pocket clip 183 is fixed to the turn knob end of the outer sleeve 156 for retaining the chalk holder in one's pocket.

Referring now particularly to FIGS. 25 to 28, there is shown a retractable holder 184 that has a knife blade 185. This holder could easily contain a soapstone, carpenter's pencil lead or a paraffin base crayon for dress making. This holder 184 has a relatively short holder tube 187 with a longitudinal slot 188 extending through one end and is closed by a reduced diameter end portion 189 at the opposite end. A solid cap 191 has a central portion 192 that is tightly fitted into reduced end portion 193 of the holder tube 187 and a concentric external sleeve portion 194 of the cap that surrounds the reduced diameter end portion 193 thereof. The knife blade 185 is fitted into a tapered end 196 of the carriage and can be dislodged therefrom by extending an instrument into a cross hole 197 in the carriage 195, FIGS. 26 and 28. The carriage 195 is of rectangular cross-section and is accommodated by an opening of similar cross-section in the holder tube 187. The carriage 195 has an open end portion 198 that can contain a soapstone, crayon, or carpenter's lead when carriage is reversed in the holder.

The carriage has two spaced projections 199 and 201 that extend outwardly through the slot 188 of the holder tube 187 and against which a propelling ring 202 engages when it is turned and worked by an internal thread 203 operable in a fast spiral groove 204 on the exterior of the holder tube 187. The turning of the ring 202 causes the knife blade 185 to be extended from or retracted into the holder tube 187.

A tapered cap 205 is tightly fitted over the reduced end 189 of the holder tube 187 through which the knife blade 185 will be extended and retracted. A closure cap 206 can be tightly fitted over the cap 205 and open the holder tube 187 and has a pocket clip 207 fixed thereto by an end screw 208. The pocket clip cap 206 is removed when it is desired to extend the knife blade 185 out of the cap 205.

It will thus be apparent that there has been provided in a holder 184 a carriage 195 which carries a knife blade 185 and is short in length yet providing adequate handle for a knife blade. It should also be apparent that this holder could easily contain instead of the knife, a soapstone, carpenter's pencil lead or a paraffin base crayon for dress making.

Referring now particularly to FIGS. 29 and 30, there is shown the form of the invention in which a double carriage 205 having a scraper blade 206 and an eraser 207 is provided in inner and outer tubes 208 and 209 so that the holder can have a smooth external surface and an operating ring 211 disposed within the holder. The inner holder tube 208 is constructed similar to the threaded holder tube 155 shown in FIG. 22. This tube 208 has a long left hand thread portion 212 with a longitudinally-extending slot 213 therein and a closed end portion 214 with a shoulder 215. Tightly fitted in the open end of the inner tube 208 is a turn knob 216 having a central sleeve portion 217 with a radially extending lug 218 that projects into the longitudinal slot 213 of the inner tube 208 to insure turning of the inner sleeve 208 within the outer sleeve 209 by the turn knob 216.

The outer tube 209 is retained on the inner tube 208 by a sleeve 219 that is threaded over left hand thread portion of the inner tube and has a shoulder 221 that abuts the end of the outer tube 209 and retains the outer tube 209 against the stop shoulder 215 on the closed end portion 214 to hold the outer tube 209 thereupon. The outer tube 209 has a slot 220 running throughout substantially the entire length thereof and one where it is held against expansion by a retaining ring 222. Fitted over the ends of the tubes and abutting the retaining ring 222, is a cap 223 through which the crayon piece 207 may be projected by the carriage 205.

The turn knob 216 has an outwardly-extending threaded sleeve portion 224 onto which a closure cap 225 is threaded to prevent the extension of the knife blade 206 by mistake when the user is trying to extend the crayon piece 207. The sleeve portion 224 of the turn knob has a dislodging hole 226 through which a tool can be extended to engage knife blade shank 229 in hole 231. The cap 225 has a pocket clip 227 so that upon the cap 225 being fixed upon the threaded sleeve portion 224 of the turn knob, the holder can be supported in one's pocket.

The carriage 205 is provided with a long reduced diameter projection 228 that carries the shank 229 of the knife blade 206 in a tight fitted manner. The shank 229 when the knife blade 206 is fully inserted in this projection 228 appears in the dislodging hole 231 into which the tool can be inserted to dislodge the blade 206 from the projection 228 when it is desired to replace the knife or scraper blade 206. The opposite end of the carriage 205 has a similar but shorter projection 232 that is preferably split to receive the crayon piece 207 and which has dislodging hole 233.

The carriage 205 has two pin projections 234 and 235 that extend into the longitudinal slot 213 of the inner tube 208. Upon the thread portion 212 of the inner tube 208 is the operating ring 211 that has a projection 236 that extends into the slot of the outer tube 209 to prevent the ring 211 from rotating while the inner tube is turned relative to the outer tube by the turn knob 216 and thus causing the movement of the ring 211 through the holder and the extension of either the knife blade 206 or the crayon 207 out of the holder and depending upon the direction of which the inner tube 208 is turned by the knob 216. The length of the holder is such that both the knife blade 206 and the crayon piece 207 will lie wholly within the holder when the carriage 205 is centered therewithin.

In FIG. 31, there is shown a still further form of the invention in which but a single carriage 241 is used in the holder for the extending of a crayon or eraser piece as by the means shown in the various forms of the invention and particularly in FIG. 30, but wherein a turn knob 242 carries a scraper blade 243 so that upon the turn knob 242 being turned the blade while being turned is not axially moved. The turn knob 242 is solid and has a drive projection 244 that extends into a slot 245 of an inner threaded tube 246 and into a groove 247 of a retaining sleeve 248 and an outer tube 249 extends over the retaining sleeve 248 and encloses the inner tube 246. Turning the knob 242 operates the carriage 241 in the same manner as the carriage 205 in FIG. 30 is operated.

The scraper blade 243 has a shank 251 that extends into a reduced diameter portion 252 on the turn knob 242 and into a dislodging hole 253 in which an instrument can be extended to dislodge the scraper blade 243 from the turn knob portion 255 of the turn knob 242. A closure cap 254 is tightly fitted over the knife blade and upon the turn knob portion 252 and can be removed when it is desired to use the scraper blade 243 and be replaced thereafter to protect one from being cut or injured by the scraper blade 243.

It should now be apparent that there has been provided retractable holders for chalk, crayon, eraser, ball point pen, and cutting and scraping elements in which the propelling action is effected by means including an operating ring that is turned on a left hand thread on a holder tube in one direction to extend the element and in the opposite direction to retract the same. In one form of the invention a single holder tube is used and the threads for the propelling ring lie externally of this tube. In other forms of the invention the threads are provided upon an inner tube lying within a smooth outer tube and the inner tube turned by a knob in the outer tube free of threads, the threads of the inner tube thereby being unexposed.

It should also be apparent that there has been provided a dual carriage with an element on each end and wherein the propelling means can serve to move the carriage in one direction or the other to project one or the other of the elements or to center the carriage and the element within the holder tubes whereby both of the elements can be centered and confined within the length of the holder tube.

While various changes may be made in the detailed construction, it shall be understood that such changes shall be within the spirit and scope of the present invention as defined by the appended claims.

What is claimed is:

1. A retractable holder for chalk, crayon, eraser, ball point pen and cutting elements and the like comprising an inner tube having a fast thread extending throughout substantially the full length thereof, a carriage operable within said inner tube, means tightly fitting one of said elements to one end of the carriage, said inner tube having an elongated slot extending substantially throughout the entire length of the tube and through one end thereof, said carriage having spaced projections extending radially outwardly and into said slot and slidable therethrough, a propelling ring operable on said inner tube along the thread thereof and disposed between the spaced projections of the carriage and engageable therewith so that as the propelling ring is operated along the thread of the inner tube the carriage will be propelled through the inner tube, an outer holder tube fitted over the inner tube and the propelling ring, said inner tube being turnable in said outer tube, said outer tube having an elongated slot similar to the elongated slot of the inner tube, said propelling ring having a pin extending into the slot of the outer tube and adapted to traverse the same, a turn knob extending from one end of the outer holder tube and fixed to the inner tube to turn the inner tube within the outer tube, said turn knob having an extension tightly fitted into the open slot end of the inner tube, a radially-extending pin projecting from the turn knob extension into the slot of the inner tube to drive the inner tube, said inner tube having a short slot extending from the open end of the tube inwardly and diametrically-opposed to the end of the elongated slot of the inner tube and said pin extending through the extension of the turn knob into the short slot of the inner tube to provide a double drive thereof.

2. A retractable holder for chalk, crayon, eraser, ball point pen and cutting elements and the like as defined in claim 1, and an internally-threaded sleeve threaded upon the open slot end of the inner tube and into the outer tube, said internally-threaded sleeve having diametrically-opposed longitudinally-extending internal grooves and said drive pin of the turn knob extension having its ends respectively extending through the slots of the outer tube and into the respective diametrically-opposed grooves of said internally-threaded sleeve.

3. A retractable holder for chalk, crayon, eraser, ball point pen and cutting elements and the like comprising an inner tube having a fast thread extending throughout substantially the full length thereof, a carriage operable within said inner tube, means tightly fitting one of said elements to one end of the carriage, said inner tube having an elongated slot extending substantially throughout the entire length of the tube and through one end thereof, said carriage having spaced projections extending radially outwardly and into said slot and slidable therethrough, a propelling ring operable on said inner tube along the thread thereof and disposed between the spaced projections of the carriage and engageable therewith so that as the propelling ring is operated along the thread of the inner tube the carriage will be propelled through the inner tube, an outer holder tube fitted over the inner tube and the propelling ring, said inner tube being turnable in said outer tube, said outer tube having an elongated slot similar to the elongated slot of the inner tube, said propelling ring having a pin extending into the slot of the outer tube and adapted to traverse the same, a turn knob extending from one end of the outer holder tube and fixed to the inner tube to turn the inner tube within the outer tube, said turn knob having an extension tightly fitted into the open slot end of the inner tube, a radially-extending pin projecting from the turn knob extension into the slot of the inner tube to drive the inner tube, said turn knob having an outwardly extending projection with means for the attachment thereto of one of the elements, and a closure cap removably fitted over the extension of the turn knob.

4. A retractable holder for chalk, crayon, eraser, ball point pen and cutting elements and the like comprising an inner tube having a fast thread extending throughout substantially the full length thereof, a carriage operable within said inner tube, means tightly fitting one of said elements to one end of the carriage, said inner tube having an elongated slot extending substantially throughout the entire length of the tube and through one end thereof, said carriage having spaced projections extending radially outwardly and into said slot and slidable therethrough, a propelling ring operable on said inner tube along the thread thereof and disposed between the spaced projections of the carriage and engageable therewith so that as the propelling ring is operated along the thread of the inner tube the carriage will be propelled through the inner tube, an outer holder tube fitted over the inner tube and the propelling ring, said inner tube being turnable in said outer tube, said outer tube having an elongated slot similar to the elongated slot of the inner tube, said propelling ring having a pin extending into the slot of the outer tube and adapted to traverse the same, a turn knob extending from one end of the outer holder tube and fixed to the inner tube to turn the inner tube within the outer tube, said turn knob having an extension tightly fitted into the open slot end of the inner tube, a radially-extending pin projecting from the turn knob extension into the slot of the inner tube to drive the inner tube, said turn knob having a central opening extending therethrough, said carriage having another element extending from the opposite end of the same and extendable through the opening in the turn knob.

5. A retractable holder for chalk, crayon, eraser, and ball point pen and cutting elements and the like as defined in claim 4, and said turn knob having a sleeve portion extending axially outwardly from the turn knob through which the element will be extended and a closure cap removably fitted upon the turn knob sleeve portion.

6. A retractable holder for chalk, crayon, eraser, and ball point pen and cutting elements and the like as defined in claim 5, and said carriage having a dislodging hole, said element fitted into the carriage to extend to the dislodging hole, said dislodging hole being adapted to receive a tool for engagement with the element to dislodge the element from the carriage, said sleeve portion of the turn knob having a dislodging hole with which the carriage dislodging hole may be aligned.

References Cited in the file of this patent
UNITED STATES PATENTS

| | | |
|---|---|---|
| 501,225 | Flake | July 11, 1893 |
| 1,734,784 | Vierling | Nov. 5, 1929 |
| 2,293,621 | Para | Aug. 18, 1942 |
| 2,298,721 | Orling | Oct. 13, 1942 |
| 2,591,831 | Knuff | Apr. 8, 1952 |
| 2,619,937 | Kostka | Dec. 2, 1952 |